United States Patent
Boss et al.

(10) Patent No.: US 9,529,986 B2
(45) Date of Patent: Dec. 27, 2016

(54) UTILIZING MULTIPLE COMPUTING DEVICES TO VERIFY IDENTITY

(71) Applicant: International Business Machines Corporation, Armonk, NY (US)

(72) Inventors: Gregory J. Boss, Saginaw, MI (US); Andrew R. Jones, Round Rock, TX (US); Charles S. Lingafelt, Durham, NC (US); Kevin C. McConnell, Austin, TX (US); John E. Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 14/509,643

(22) Filed: Oct. 8, 2014

(65) Prior Publication Data
US 2016/0103981 A1    Apr. 14, 2016

(51) Int. Cl.
| H04L 29/06 | (2006.01) |
| G06F 21/31 | (2013.01) |
| G06F 7/04 | (2006.01) |
| G06F 15/16 | (2006.01) |
| G06F 17/30 | (2006.01) |

(52) U.S. Cl.
CPC ........... *G06F 21/31* (2013.01); *H04L 63/0876* (2013.01)

(58) Field of Classification Search
None
See application file for complete search history.

(56) References Cited

U.S. PATENT DOCUMENTS

| 8,006,300 | B2 | 8/2011 | Mizrah |
| 8,195,576 | B1 | 6/2012 | Grigg et al. |
| 8,705,720 | B2 * | 4/2014 | Kurapati ............ H04L 63/08 379/142.05 |
| 2006/0212702 | A1 | 9/2006 | Firestone et al. |
| 2008/0146193 | A1 | 6/2008 | Bentley et al. |
| 2008/0159534 | A1 | 7/2008 | Rager et al. |
| 2008/0168540 | A1 | 7/2008 | Agarwal et al. |
| 2008/0319896 | A1 | 12/2008 | Carlson et al. |

(Continued)

FOREIGN PATENT DOCUMENTS

| GB | 2281991 A | 3/1995 |
| WO | 2011041073 A1 | 4/2011 |
| WO | 2013163625 A1 | 10/2013 |

OTHER PUBLICATIONS

Appendix P (List of IBM Patents or Patent Applications Treated As Related) filed Feb. 17, 2016.

(Continued)

*Primary Examiner* — Shin-Hon Chen
(74) *Attorney, Agent, or Firm* — Maeve Carpenter (57) ABSTRACT

A tool for identify verification using computing device collaboration. The tool generates a hash based, at least in part, on device specific information for one or more user owned devices. The tool determines whether a hash for the initial device matches the hash for at least one of the one or more user owned devices, and if so, sends, one or more challenge questions to the initial device, wherein the one or more challenge questions include at least one challenge question based on the device specific information for the one or more user owned devices. The tool determines whether each of one or more responses to the one or more challenge questions is correct.

17 Claims, 3 Drawing Sheets

(56) References Cited

U.S. PATENT DOCUMENTS

| | | | |
|---|---|---|---|
| 2009/0210927 A1* | 8/2009 | Mokuya | H04L 9/3226 726/3 |
| 2010/0100898 A1* | 4/2010 | Pfleging | H04N 7/17318 725/28 |
| 2011/0307694 A1 | 12/2011 | Broustis et al. | |
| 2012/0072975 A1 | 3/2012 | Labrador et al. | |
| 2012/0131658 A1 | 5/2012 | Ramaswamy et al. | |
| 2012/0216260 A1 | 8/2012 | Crawford et al. | |
| 2013/0191902 A1 | 7/2013 | Friedl et al. | |
| 2013/0222109 A1* | 8/2013 | Lim | G06F 11/006 340/5.8 |
| 2013/0340058 A1 | 12/2013 | Barnes et al. | |
| 2014/0047510 A1* | 2/2014 | Belton | H04L 9/32 726/4 |
| 2014/0115670 A1 | 4/2014 | Barton et al. | |
| 2014/0129834 A1* | 5/2014 | Brill | H04L 9/3226 713/168 |
| 2014/0255036 A1* | 9/2014 | Jovicic | H04B 10/116 398/115 |
| 2014/0337956 A1* | 11/2014 | Korgaonkar | H04W 12/06 726/9 |
| 2015/0089621 A1* | 3/2015 | Khalid | H04L 63/08 726/9 |
| 2015/0271177 A1* | 9/2015 | Mun | H04L 63/0853 726/7 |
| 2015/0350204 A1* | 12/2015 | Wang | G06F 17/30345 726/9 |

OTHER PUBLICATIONS

U.S. Appl. No. 15/045,784, entitled "Credential Validation Using Multiple Computing Devices", filed Feb. 17, 2016.

Darmawan et al., "WebSphere Portal Collaboration Security Handbook", IBM Corporation, Redbooks, Dec. 2004.

Honan, "How Apple and Amazon Security Flaws Led to My Epic Hacking", Aug. 6, 2012, <http://www.wired.com/2012/08/apple-amazon-mat-honan-hacking/>.

Madan et al., "Securely Adopting Mobile Technology Innovations for Your Enterprise Using IBM Security Solutions"; IBM Corporation, 2013.

"Multi Multi-Factor Authentication", Authy Blog, Nov. 21, 2013, <http://blog.authy.com/multi-device>.

Sabzevar et al., "Universal Multi-Factor Authentication Using Graphical Passwords", IEEE, 2008, pp. 625-632.

U.S. Appl. No. 14/509,489, entitled "Credential Validation Using Multiple Computing Devices", filed Oct. 8, 2014.

* cited by examiner

UTILIZING MULTIPLE COMPUTING DEVICES TO VERIFY IDENTITY

BACKGROUND OF THE INVENTION

The present invention relates generally to cyber security, and more particularly to identity verification.

Some computing systems that utilize a password to authenticate a user provide the capability to reset a forgotten password if the user can correctly answer one or more private security questions, such as "What is your mother's maiden name". While this security feature provides a way to verify the identity of the user, the security questions asked are often answered by information that is publicly available, and as such, are easily circumvented. Additionally, harvesting programs designed to gather this information from various public sources are often employed by computer hackers to obtain answers to commonly asked security questions. Therefore, the use of common security questions and answers are for the convenience of the users, and not for the security of the system.

SUMMARY

Aspects of an embodiment of the present invention disclose a method, system, and computer program product for identity verification using multiple computing devices. The method includes generating, by one or more computer processors, a hash based, at least in part, on device specific information for one or more user owned devices, the device specific information for the one or more user owned devices registered in a user account. In response to receiving a request from an initial device to verify a user's identity, the method includes determining, by one or more computer processors, whether a hash for the initial device matches the hash for at least one of the one or more user owned devices, and if so, sending, by one or more computer processors, one or more challenge questions to the initial device, wherein the one or more challenge questions include at least one challenge question based on the device specific information. The method includes determining, by one or more computer processors, whether each of one or more responses to the one or more challenge questions is correct.

DETAILED DESCRIPTION

Embodiments of the present invention recognize that hackers are using publically available information to reset user passwords to gain access to accounts. Embodiments of the present invention further recognize that exposing a challenge question to the public provides a hacker with an opportunity to spoof a system by finding personal or publically available information to overcome the challenge question.

Embodiments of the present invention provide the capability to secure password reset requests by leveraging unique hardware identifiers of a user owned computing device to authenticate the user. Embodiments of the present invention further provide the capability to create a topology of trusted devices for authenticating the user.

Implementation of such embodiments may take a variety of forms, and exemplary implementation details are discussed subsequently with reference to the Figures.

Figure 1:
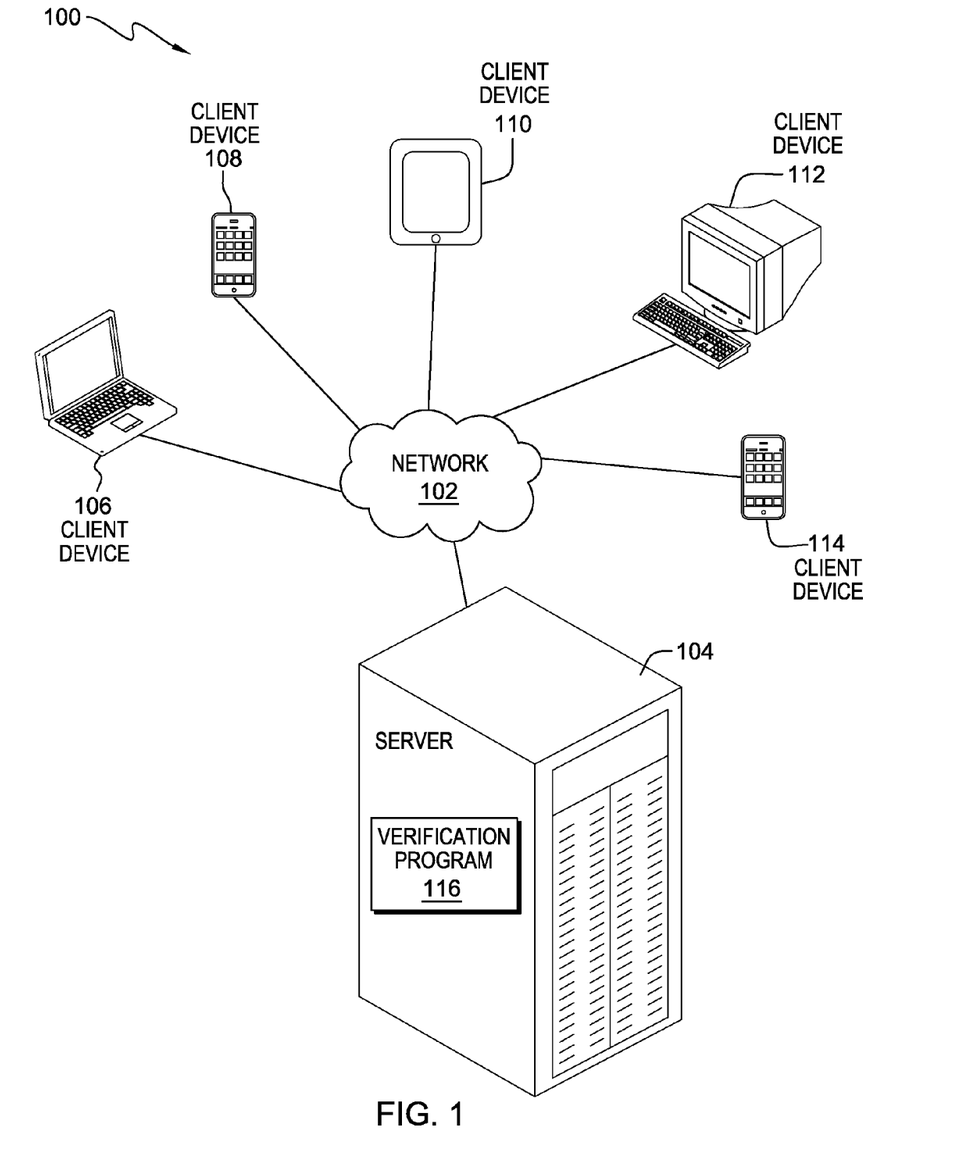
FIG. 1 illustrates a functional block diagram illustrating a data processing environment, generally designated 100, in accordance with an embodiment of the present invention.

The present invention will now be described in detail with reference to the Figures. FIG. 1 is a functional block diagram illustrating a data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Data processing environment 100 includes network 102, server 104, and multiple client devices, such as client device 106, client device 108, client device 110, client device 112, and client device 114.

In the exemplary embodiment, network 102 is the Internet representing a worldwide collection of networks and gateways that use TCP/IP protocols to communicate with one another. Network 102 may include wire cables, wireless communication links, fiber optic cables, routers, switches and/or firewalls. Server 104, client device 106, client device 108, client device 110, client device 112, and client device 114 are interconnected by network 102. Network 102 can be any combination of connections and protocols capable of supporting communications between server 104, client device 106, client device 108, client device 110, client device 112, client device 114 and verification program 116. Network 102 may also be implemented as a number of different types of networks, such as an intranet, a local area network (LAN), a virtual local area network (VLAN), or a wide area network (WAN). FIG. 1 is intended as an example and not as an architectural limitation for the different embodiments.

In the exemplary embodiment, server 104 may be, for example, a server computer system such as a management server, a web server, or any other electronic device or computing system capable of sending and receiving data. In another embodiment, server 104 may be a data center, consisting of a collection of networks and servers providing an IT service, such as virtual servers and applications deployed on virtual servers, to an external party. In another embodiment, server 104 represents a "cloud" of computers interconnected by one or more networks, where server 104 is a computing system utilizing clustered computers and components to act as a single pool of seamless resources when accessed through network 102. This is a common implementation for data centers in addition to cloud computing applications.

In the exemplary embodiment, server 104 includes a verification program 116 for identity verification using computing device collaboration. In the exemplary embodiment, verification program 116 is a software-based program capable of authenticating a user owned device, such as client devices 106, 108, 110, 112, and 114, by leveraging one or more hardware identification attributes unique to the user owned device to generate a hash, wherein the hash includes a plurality of device specific information gleaned from the one or more hardware identification attributes. In the exemplary embodiment, verification program 116 utilizes a plurality of user owned devices, such as client devices 106, 108, 110, 112, and 114, to create a topology of trusted devices, such as a circle topology or a star topology, from which to verify a user's identity through collaboration between each of the plurality of user owned devices within the topology of trusted devices. In the exemplary embodiment, in response to receiving a request to validate the user's identity, verification program 116 selects a first user owned device participating in the topology of trusted devices at random, queries the first user owned device for a hash containing a plurality of device specific information, and authenticates the first user owned device based, at least in part, on the hash. In response to successfully authenticating the first user owned device, verification program 116 sends a challenge question to the first user owned device, wherein the challenge question is a randomly generated question about a hardware identification attribute existing on a second user owned device participating in the topology of trusted devices. In the exemplary embodiment, verification program 116 validates a response to the challenge question, and repeats this process for a pre-defined number of user owned devices participating in the topology of trusted devices. In response to successful completion of validating the pre-defined number of user owned devices, verification program 116 confirms the user's identity and allows the password to be reset.

In the exemplary embodiment, verification program 116 operates on a central server, such as server 104, and can be utilized by one or more client devices, such as client devices 106, 108, 110, 112, and 114 via a mobile application download from the central server or a third-party application store, and executed on the one or more client devices as an agent to verification program 116. For example, a user can communicate with verification program 116 via a verification program agent application (not shown). In another embodiment, verification program 116 may be a software-based program, downloaded from a central server, such as server 104, and installed on one or more client devices, such as client devices 106, 108, 110, 112, and 114. In yet another embodiment, verification program 116 may be utilized as a software service provided by a third-party cloud service provider (not shown).

In the exemplary embodiment, client devices 106, 108, 110, 112, and 114 are clients to server 104 and may be, for example, a desktop computer, a laptop computer, a tablet computer, a personal digital assistant (PDA), a smart phone, a thin client, or any other electronic device or computing system capable of communicating with server 104 through network 102. For example, client device 108 and client device 114 may be mobile devices capable of connecting to a network, such as network 102, to access a website or a mobile application requiring identity verification, such as a mobile banking application.

In an alternate embodiment, client devices 106, 108, 110, 112, and 114 may be any wearable electronic device, including wearable electronic devices affixed to eyeglasses and sunglasses, helmets, wristwatches, clothing, wigs, and the like, capable of sending, receiving, and processing data. For example, client device 106 and client device 110 may be a wearable electronic device, such as a wristwatch, capable of executing an application and initiating a password reset request, or any other suitable identity verification process, for example, in the course of communicating with a website (e.g., logging into a social networking site or purchasing goods) or accessing mobile application (e.g., logging into a mobile banking application to check account status).

Data processing environment 100 may include additional client devices, servers, networks, displays, and other devices not shown.

Figure 2:
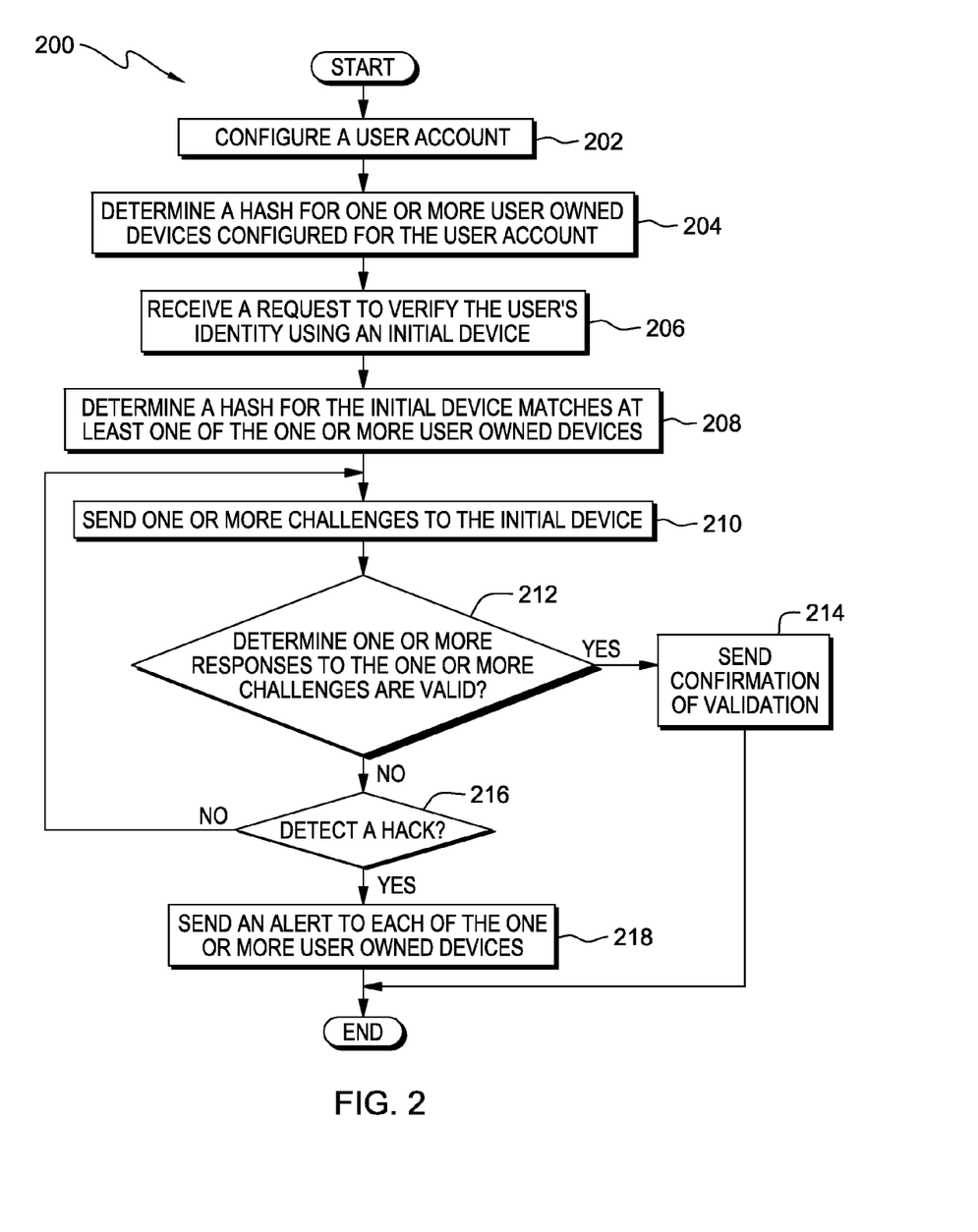
FIG. 2 illustrates a flowchart of an exemplary process flow, generally designated 200, for identity verification using computing device collaboration, in accordance with an embodiment of the present invention.

FIG. 2 illustrates a flowchart of an exemplary process flow, generally designated 200, for identity verification using computing device collaboration, in accordance with an embodiment of the present invention.

Verification program 116 configures a user account (202). In the exemplary embodiment, in response to a user downloading a verification program agent application from, for example, an application store or a website, and installing the verification program agent application on a user owned device, verification program 116 configures a user account, wherein the configuring a user account includes, without limitation, creating a user account ID, configuring one or more user owned devices for the user account, wherein configuring the one or more user owned devices includes identifying one or more user owned devices having installed the verification program agent application, and for each of these user owned devices, selecting one or more device attributes for uniquely identifying the one or more user owned devices, and creating a user account password. In one embodiment, verification program 116 creates a user account ID from a user's name and a sequence of numbers, wherein the user account ID may be, for example, randomly generated from information provided by the user, or pre-defined by the user during configuration of the user account. In one embodiment, verification program 116 identifies the one or more devices by, for example, tracking each of the one or more devices accessing the user account (i.e., a user owned device, having a verification program agent application, from which a user logs into their user account is identified as one of the one or more devices configured for the user's account), or simply by receiving confirmation from the user that a particular device is to be identified as one of the one or more devices configured for the user account. In an exemplary embodiment, verification program 116 selects the one or more device attributes for uniquely identifying the one or more user owned devices by querying the one or more user owned devices for a plurality of hardware identification attributes (i.e., device attributes), wherein the one or more device attributes may include, without limitation, a device ID number, an IMEI number, a pin number, a phone number associated with the user owned device, or any other suitable device attribute that functions to uniquely identify the one or more user owned devices. In another embodiment, a user can input the one or more device attributes for use by verification program 116. In one embodiment, verification program 116 creates a user account password, wherein the user account password may be, for example, randomly generated from information provided by the user, or pre-defined by the user during configuration of the user account.

Verification program 116 determines a hash for each of the one or more user owned devices configured for the user account (204). In the exemplary embodiment, verification program 116 determines a hash for each of the one or more user owned devices configured for the user account by retrieving the one or more device attributes selected for uniquely identifying each of the one or more user owned devices and generates a hash (i.e., a hash key) that incorporates at least one of the one or more device attributes. In one embodiment, a user may select the one or more device attributes from which to generate the hash from a predefined list of approved device attributes utilizing a user interface, wherein the one or more device attributes may include, without limitation, a device ID number, an IMEI number, a pin number, a phone number associated with the user owned device, or any other suitable device attribute that functions to uniquely identify the one or more user owned devices. In another embodiment, verification program 116 may select the one or more device attributes from which to generate the hash may be randomly from a predefined list of approved device attributes, wherein the one or more device attributes may include, without limitation, a device ID number, an IMEI number, a pin number, a phone number associated with the user owned device, or any other suitable device attribute that functions to uniquely identify the one or more user owned devices. In one embodiment, the logic for generating the hash may be stored in a database within server 104. For example, verification program 116 may determine a hash for a particular user owned device, such that the hash includes a user ID as well as a first and a second character from each of the one or more device attributes selected for uniquely identifying the particular user owned device. In the exemplary embodiment, in response to determining a hash for each of the one or more devices configured for the user account, verification program 116 stores the hash for each of the one or more devices in a service database on a centralized master system server, such as server 104.

Verification program 116 receives a request to verify a user's identity using an initial device (206). In the exemplary embodiment, verification program 116 receives a request to verify a user's identity using an initial device from, for example, a website configured to utilize computing device collaboration in identity verification, such as the type of identify verification provided by verification program 116. In one embodiment, verification program 116 receives a request to verify a user's identity when a password reset request is initiated from the website. For example, a particular website, such as a banking website, agrees to utilize verification program 116 for identify verification using computing device collaboration. In response to a user creating an account with the particular website, verification program 116 may prompt the user to agree to identity verification through computing device collaboration. Additionally, the website may specify a requisite minimum number of user owned devices in order for a user to qualify for identify verification through computing device collaboration. For example, the website may specify that five user owned devices, with each user owned device having a verification program agent application installed, is a minimum number of user owned devices in order for a user to qualify for identify verification through computing device collaboration. In one embodiment, in response to initiating a password reset request, the website sends a request to verification program 116 to verify a user's identity. In response to receiving a request to verify a user's identity, verification program 116 prompts the user to identify an initial device from the one or more user owned devices configured to their user account that is powered up and connected to a network, such as network 102.

Verification program 116 determines a hash for the initial device matches at least one of the one or more user owned devices (208). In the exemplary embodiment, in response to receiving a request to verify a user's identity using an initial device, verification program 116, via a verification program agent application, determines the hash on the initial device by querying the initial device for one or more device attributes, and incorporates the one or more device attributes into a pre-determined sequence initially used for generating a hash for each of the one or more user owned devices configured to the user account. For example, if a pre-determined sequence, such as a user ID followed by a first character of each of the one or more user owned devices, was used to initially generate a hash for each of the one or more user owned devices configured to the user account, verification program 116 determines a hash for the initial device by following the same pre-determined sequence. In the exemplary embodiment, in response to determining a hash for the initial device, verification program 116 sends the hash for the initial device to a centralized master system server, such as server 104. Verification program 116 determines the hash for the initial device matches at least one of the one or more user owned devices configured for the user account when the hash for the initial device is an identical match to a hash for at least one of the one or more user owned devices configured to the user account (i.e., the sequence of the hash for the initial device shares the same sequence of a hash for at least one of the one or more devices configured for the user account, and the sequences share the same values).

In response to determining the hash for the initial device matches at least one of the one or more user owned devices, verification program 116 sends one or more challenge questions to the initial device (210). In the exemplary embodiment, verification program sends one or more challenge questions to the initial device via a verification program agent application, wherein the one or more challenge questions include, without limitation, a single question regarding one or more device attributes specific to the one or more user owned devices, a series of questions regarding one or more device attributes specific to the one or more user owned devices, where answers to the series of questions must be submitted in a particular order across one or more of the user owned devices, and a combination of the single question and the series of questions. In one embodiment, the one or more of challenge questions are selected randomly from a pre-defined list of challenge questions. In another embodiment, the one or more challenge questions are selected based, at least in part, on a level of complexity (i.e., a level of difficulty) warranted for the type of access requested. For example, verification program 116 may send a question to the initial device (e.g., a personal computer) about a device attribute, such as an IMEI number, unique to a second device, such as a smart phone, configured for the user's account, and prompt the user to enter the IMEI number of the second device on a third device, such as a tablet, configured for the user's account. In the exemplary embodiment, verification program 116 sends one or more challenge questions to the initial device for a pre-determined number of times (i.e., as defined by the user when initially configuring the user account). For example, verification program 116 may send five randomly generated challenge questions to the initial device. In another embodiment, in response to determining the hash for the initial device does not match at least one of the one or more use owned devices, verification program 116 may send a notification to each of the one or more user owned devices alerting the user that a hack has been detected.

Verification program 116 determines each of the one or more responses to the one or more challenge questions are valid (212). In the exemplary embodiment, verification program 116 determines each of the one or more responses to the one or more challenge questions are valid by querying a database storing the one or more device attributes for the one or more user owned devices and determining whether each of the one or more responses to the one or more challenge questions matches the one or more data attributes for each of the one or more user owned devices targeted by the one or more challenge questions. For example, where a first question targets a specific device attribute for a first user owned device, such as "What are the first three values of the serial number on the back of the user's tablet," verification program 116 can query the database for the one or more device attributes for the user's tablet and determine whether a response, such as "6-0-7" matches the first three values of the serial number for the user's tablet stored in the database. In another example, in the case where a challenge requires the user to enter one or more device attributes of a first user owned device, such as a four digit pin number, across four different user owned devices, the first digit of the pin on a second user owned device, a second digit on a third user owned device, and so on, verification program 116 can query the database for the one or more device attributes for the first user owned device to determine the response values for the pin number match the values of the pin number stored in the database, as well as determine that the correct values originated from the correct user owned device, by matching, for example, a hash from the second user owned device with a hash stored in the database initially generated for the second user owned device during configuration of the user account. In yet another example, verification program 116 can send a message or phrase to a first user owned device and instruct the user to enter the message or phrase as a response from a second user owned device. Once a correct response is made from the second user owned device, verification program 116 provides a word to the first user owned device and instructs the user to enter the word as a response from a third user owned device. In the exemplary embodiment, verification program 116 repeats this process a pre-defined number of times based, at least in part, on the configuration of the user account.

In response to determining each of the one or more responses to each of the one or more challenge questions are correct, verification program 116 sends a confirmation of validation (YES branch 214). In the exemplary embodiment, verification program 116 sends a confirmation of validation to the website where the request to verify a user's identity originated and passes control back to the website allowing a password to be reset.

In response to determining each of the one or more responses to each of the one or more challenge questions are not correct, verification program 116 determines whether a hack is detected (NO branch 216). In the exemplary embodiment, verification program 116 determines whether a hack is detected by determining whether a pre-defined number of failed responses have been received based, at least in part, on the configuration of the user account. For example, a configuration of a user account may specify that after five consecutive failed responses alert the user of a potential hack. In the exemplary embodiment, in response to determining that a pre-defined number of failed responses have been received, verification program 116 sends an alert to each of the one or more user owned devices configured for the user account (YES branch 218). In response to determining that a pre-defined number for failed responses have not been received, verification program 116 repeats sending one or more challenge questions to the initial device and determining the one or more responses to the one or more challenge questions are correct (NO branch 216).

Figure 3:
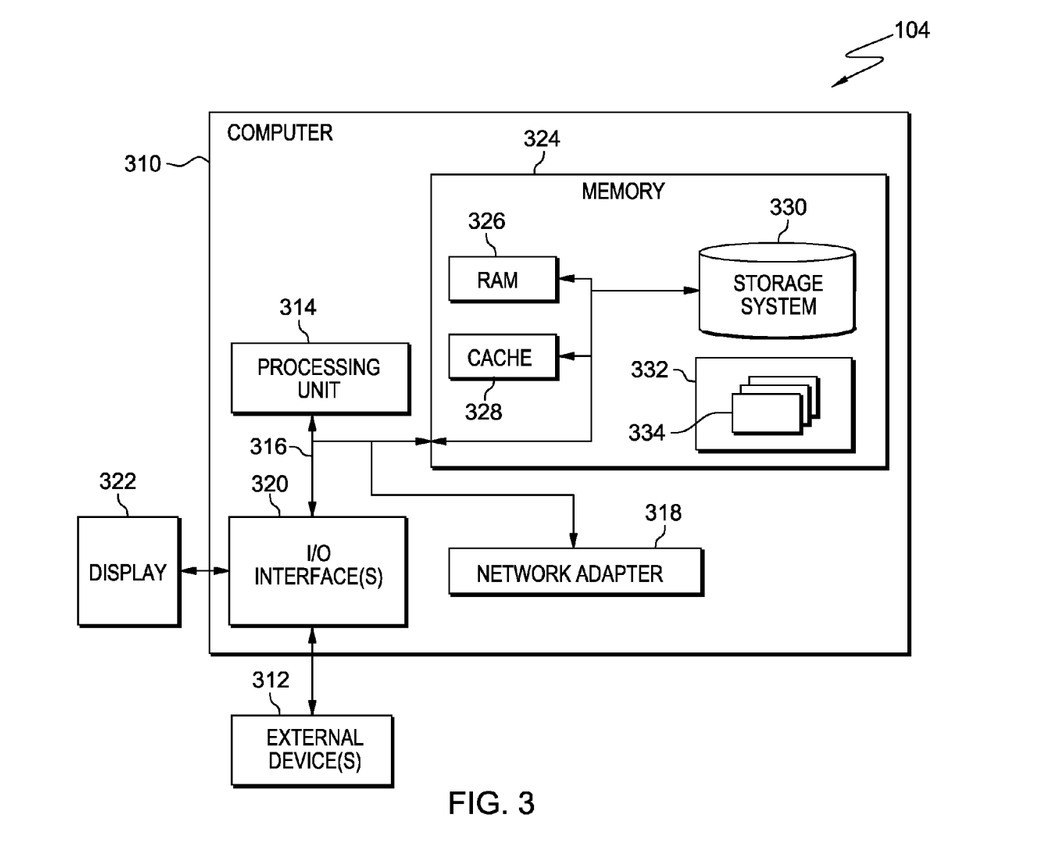
FIG. 3 illustrates a block diagram depicting components of a data processing system (such as server 104 of FIG. 1), in accordance with an embodiment of the present invention.

FIG. 3 depicts a block diagram of components of a data processing system in data processing environment 100, such as server 104, in accordance with an illustrative embodiment of the present invention. It should be appreciated that FIG. 3 provides only an illustration of one implementation and does not imply any limitations with regard to the environments in that different embodiments may be implemented. Many modifications to the depicted environment may be made.

In the illustrative embodiment, server 104 in data processing environment 100 is shown in the form of a general-purpose computing device. The components of computer system 310 may include, but are not limited to, one or more processors or processing unit(s) 314, a system memory 324, and a bus 316 that couples various system components including system memory 324 to processing unit(s) 314.

Bus 316 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 310 typically includes a variety of computer system readable media. Such media may be any available media that is accessible by computer system 310, and it includes both volatile and non-volatile media, removable and non-removable media.

System memory 324 can include computer system readable media in the form of volatile memory, such as random access memory (RAM) 326 and/or cache memory 328. Computer system 310 may further include other removable/non-removable, volatile/non-volatile computer system storage media. By way of example only, storage system 330 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 316 by one or more data media interfaces. As will be further depicted and described below, system memory 324 may include at least one computer program product having a set (e.g., at least one) of program modules that are configured to carry out the functions of embodiments of the invention.

Program/utility 332, having one or more sets of program modules 334, may be stored in memory 324 by way of example, and not limitation, as well as an operating system, one or more application programs, other program modules, and program data. Each of the operating systems, one or more application programs, other program modules, and program data, or some combination thereof, may include an implementation of a networking environment. Program modules 334 generally carry out the functions and/or methodologies of embodiments of the invention as described herein. Computer system 310 may also communicate with one or more external devices 312 such as a keyboard, a pointing device, a display 322, etc., or one or more devices that enable a user to interact with computer system 310 and any devices (e.g., network card, modem, etc.) that enable computer system 310 to communicate with one or more other computing devices. Such communication can occur via Input/Output (I/O) interface(s) 320. Still yet, computer system 310 can communicate with one or more networks such as a local area network (LAN), a general wide area network (WAN), and/or a public network (e.g., the Internet)

via network adapter 318. As depicted, network adapter 318 communicates with the other components of computer system 310 via bus 316. It should be understood that although not shown, other hardware and software components, such as microcode, device drivers, redundant processing units, external disk drive arrays, RAID systems, tape drives, and data archival storage systems may be used in conjunction with computer system 310.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method for improving identity verification using a topology of trusted devices, the method comprising:
   generating, by one or more computer processors, a hash based, at least in part, on device specific information for one or more user owned devices, the device specific information for the one or more user owned devices registered in a user account;
   in response to receiving a request from an initial device to verify a user's identity, determining, by one or more computer processors, whether a hash for the initial device matches the hash for at least one of the one or more user owned devices, wherein determining whether the hash for the initial device matches the hash for at least one of the one or more user owned devices includes querying the initial device for one or more of its device attributes; incorporating one or more device attributes of the initial device into a pre-determined sequence initially used for generating the hash for each of the one or more user owned devices registered in the user account; and determining a sequence of the hash for the initial device matches the pre-determined sequence of the hash for at least one of the one or more devices registered in the user account, wherein the sequence of the hash for the initial device matches the pre-determined sequence of the hash for at least one of the one or more devices registered in the user account when each value for both sequences match; and
   if so, sending, by one or more computer processors, one or more challenge questions to the initial device, wherein the one or more challenge questions include at least one challenge question based on the device specific information of at least one additional device from the one or more user owned devices; and
   determining, by one or more computer processors, whether each of one or more responses to the one or more challenge questions is correct.

2. The method of claim 1, comprising:
   selecting, by one or more computer processors, one or more device attributes unique to each of the one or more user owned devices, wherein selecting the one or more device attributes includes querying, by one or more computer processors, the one or more user owned devices for a plurality of hardware identification including:
      a device ID number;
      an IMEI number;
      a pin number;
      a phone number associated with the one or more user owned devices; and
      a device serial number.

3. The method of claim 1, wherein further comprising:
   retrieving, by one or more computer processors, one or more device attributes unique to each of the one or more user owned devices;
   generating, by one or more computer processors, a hash key for each of the one or more user owned devices, wherein the hash key is generated based on at least one of the one or more device attributes unique to each of the one or more user owned devices; and
   storing, by one or more computer processors, the hash key for each of the one or more user owned devices in a database.

4. The method of claim 1, wherein the one or more challenge questions include one or more of:
   a single question regarding one or more device attributes specific to the at least one additional device from the one or more user owned devices;
   a series of questions regarding one or more device attributes specific to the one or more user owned devices, where one or more responses to the series of questions must be submitted in a particular order across the at least one additional device from one or more user owned devices; and
   a combination of the single question and the series of questions.

5. The method of claim 4, wherein sending the one or more challenge questions to the initial device, further comprises sending, by one or more computer processors, the one or more challenge questions to the initial device for a pre-determined number of times, wherein the pre-determined number of times is defined when initially configuring the user account, based, at least in part, on a user preference and a level of security desired.

6. The method of claim 1, wherein determining each of one or more responses to the one or more challenge questions is correct, further comprises:
   querying, by one or more computer processors, a database storing one or more device attributes for the one or more user owned devices;
   determining, by one or more computer processors, whether each of the one or more responses to the one or more challenge questions matches the one or more device attributes for each of the at least one additional device from the one or more user owned devices targeted by the one or more challenge questions; and
   sending, by one or more computer processors, a confirmation of validation.

7. The method of claim 1 further comprises, in response to determining each of the one or more responses to each of the one or more challenge questions are not correct, determining, by one or more computer processors, whether a pre-defined number of failed responses have been received, based, at least in part, on a configuration of the user account.

8. The method of claim 7 further comprising:
   in response to determining a pre-defined number of failed responses have been received, sending, by one or more computer processors, an alert to each of the one or more user owned devices configured to the user account.

9. The method of claim 7 further comprising:

in response to determining a pre-defined number of failed responses have not been received, sending, by one or more computer processors, at least one additional challenge question to the initial device, wherein the at least one additional challenge question is based on the device specific information for the one or more user owned devices; and determining, by one or more computer processors, whether each of one or more responses to the at least one additional challenge question are correct.

10. A computer program product for improving identity verification using a topology of trusted devices, the computer program product comprising:

one or more computer readable storage devices and program instructions stored on the one or more computer readable storage devices, the program instructions comprising:

program instructions to generate, by one or more computer processors, a hash based, at least in part, on device specific information for one or more user owned devices, the device specific information for the one or more user owned devices registered in a user account;

in response to receiving a request from an initial device to verify a user's identity, program instructions to determine, by one or more computer processors, whether a hash for the initial device matches the hash for at least one of the one or more user owned devices, wherein determining whether the hash for the initial device matches the hash for at least one of the one or more user owned devices includes querying the initial device for one or more of its device attributes; incorporating one or more device attributes of the initial device into a pre-determined sequence initially used for generating the hash for each of the one or more user owned devices registered in the user account; and determining a sequence of the hash for the initial device matches the pre-determined sequence of the hash for at least one of the one or more devices registered in the user account, wherein the sequence of the hash for the initial device matches the pre-determined sequence of the hash for at least one of the one or more devices registered in the user account when each value for both sequences match; and if so, program instructions to send, by one or more computer processors, one or more challenge questions to the initial device, wherein the one or more challenge questions include at least one challenge question based on the device specific information of at least one additional device from the one or more user owned devices; and program instructions to determine, by one or more computer processors, whether each of one or more responses to the one or more challenge questions is correct.

11. The computer program product of claim 10, further comprises:

program instructions to retrieve, by one or more computer processors, the one or more device attributes selected for uniquely identifying each of the one or more user owned devices;

program instructions to generate, by one or more computer processors, a hash key for each of the one or more user owned devices, wherein the hash key incorporates at least one of the one or more device attributes unique to each of the one or more user owned devices; and program instructions to store, by one or more computer processors, the hash key for each of the one or more user owned devices in a database.

12. The computer program product of claim 10, wherein program instructions to determine each of one or more responses to the one or more challenge questions are correct, further comprises:

program instructions to query, by one or more computer processors, a database storing one or more the one or more device attributes for the one or more user owned devices;

program instructions to determine, by one or more computer processors, whether each of the one or more responses to the one or more challenge questions matches the one or more device attributes for each of the at least one additional device from the one or more user owned devices targeted by the one or more challenge questions; and program instructions to send, by one or more computer processors, a confirmation of validation.

13. The computer program product of claim 10 further comprises, in response to determining each of the one or more responses to each of the one or more challenge questions are not correct, program instructions to determine, by one or more computer processors, whether a pre-defined number of failed responses have been received, based, at least in part, on a configuration of the user account.

14. A computer system for improving identity verification using a topology of trusted devices, the computer system comprising:

one or more computer readable storage devices;

program instructions stored on at least one of the one or more computer readable storage devices for execution by at least one of the one or more computer processors, the program instructions comprising:

program instructions to generate, by one or more computer processors, a hash based, at least in part, on device specific information for one or more user owned devices, the device specific information for the one or more user owned devices registered in a user account;

in response to receiving a request from an initial device to verify a user's identity, program instructions to determine, by one or more computer processors, whether a hash for the initial device matches the hash for at least one of the one or more user owned devices, wherein determining whether the hash for the initial device matches the hash for at least one of the one or more user owned devices includes querying the initial device for one or more of its device attributes; incorporating one or more device attributes of the initial device into a pre-determined sequence initially used for generating the hash for each of the one or more user owned devices registered in the user account; and determining a sequence of the hash for the initial device matches the pre-determined sequence of the hash for at least one of the one or more devices registered in the user account, wherein the sequence of the hash for the initial device matches the pre-determined sequence of the hash for at least one of the one or more devices registered in the user account when each value for both sequences match; and if so, program instructions to send, by one or more computer processors, one or more challenge questions to the initial device, wherein the one or more challenge questions include at least one challenge question based on the device specific information of the at least one additional device from the one or more user owned devices; and program instructions to determine, by one or more computer processors, whether each of one or more responses to the one or more challenge questions is correct.

15. The computer system of claim 14, further comprises:
program instructions to retrieve, by one or more computer processors, the one or more device attributes selected for uniquely identifying each of the one or more user owned devices;

program instructions to generate, by one or more computer processors, a hash key for each of the one or more user owned devices, wherein the hash key incorporates at least one of the one or more device attributes unique to each of the one or more user owned devices; and program instructions to store, by one or more computer processors, the hash key for each of the one or more user owned devices in a database.

16. The computer system of claim 14, wherein program instructions to determine each of one or more responses to the one or more challenge questions are correct, further comprises:

program instructions to query, by one or more computer processors, a database storing one or more device attributes for the one or more user owned devices;

program instructions to determine, by one or more computer processors, whether each of the one or more responses to the one or more challenge questions matches the one or more device attributes for each of the at least one additional device from the one or more user owned devices targeted by the one or more challenge questions; and program instructions to send, by one or more computer processors, a confirmation of validation.

17. The computer system of claim 14 further comprises, in response to determining each of the one or more responses to each of the one or more challenge questions are not correct, program instructions to determine, by one or more computer processors, whether a pre-defined number of failed responses have been received, based, at least in part, on t-lie a configuration of the user account.

* * * * *